United States Patent [19]

Mann

[11] Patent Number: 5,007,664
[45] Date of Patent: Apr. 16, 1991

[54] JOINT IN FUME-EXTRACTING WELDING GUN

[75] Inventor: Robert N. Mann, Mississauga, Canada

[73] Assignee: Mig Vac Inc., Mississauga, Canada

[21] Appl. No.: 422,760

[22] Filed: Oct. 17, 1989

[51] Int. Cl.⁵ .............................................. F16L 35/00
[52] U.S. Cl. .................................... 285/330; 285/155; 285/137.1; 285/419; 285/423
[58] Field of Search ............ 285/150, 155, 156, 137.1, 285/373, 419, 423, 330

[56] References Cited

U.S. PATENT DOCUMENTS

| | | | |
|---|---|---|---|
| 2,128,720 | 8/1938 | Tweedale | 285/156 X |
| 3,417,194 | 12/1968 | Meyer et al. | 285/156 X |
| 3,633,943 | 1/1972 | Ramm et al. | 285/373 X |
| 3,711,633 | 1/1973 | Ghirardi et al. | 285/156 X |
| 4,109,944 | 8/1978 | Curtin | 285/373 |
| 4,434,823 | 3/1984 | Hudspith | 285/137.1 X |
| 4,496,823 | 1/1985 | Mann | 219/137.41 |
| 4,750,525 | 6/1988 | Vaughan | 285/423 X |
| 4,915,424 | 4/1990 | Sarno et al. | 285/156 |

FOREIGN PATENT DOCUMENTS 1220515  1/1971  United Kingdom ............ 285/137.1

Primary Examiner—Randolph A. Reese
Assistant Examiner—David Bartczak
Attorney, Agent, or Firm—Sim & McBurney

[57] ABSTRACT

A conventional T-Y joint of a fume-extracting welding gun is constructed of two semi-circularly contoured parts which are snap-locked together along a longitudinal line of join. One part may have a cylindrical portion integrally formed therewith to form an end closure for the joint. The end closure has bores for utility feeds therethrough, with that for the power cable being provided with an integrally-formed hexagonal recess to receive a hexagonal nut on the power cable to enable the power cable to be clamped to the joint.

3 Claims, 3 Drawing Sheets

JOINT IN FUME-EXTRACTING WELDING GUN

FIELD OF INVENTION

The present invention relates to fume-extracting welding guns and, in particular, with a joint at the services supply area of the gun which permits supply of services and removal of fumes.

BACKGROUND TO THE INVENTION

Arc welding operations are known to produce undesirable fumes during the welding process, many of them being noxious to the welder or others in the vicinity of the welding operation. Such fumes, when allowed to accumulate in confined spaces have long been known to constitute a safety hazard, as well as an interference to welder visibility and general welding operation efficiency, and numerous means have been used by the welding industry to dissipate these fumes as they are generated.

One such procedure involves the use of a conduit associated with the welding gun through which undesirable product gases of the welding operation are extracted by means of a vacuum applied to the conduit. The conduit commonly comprises an outer shell defining a hollow conduit through which the gases pass and in which are located a continuous weld wire, a power cable and also a source of shield gas for the welding wire.

The welding gun is connected to a vacuum system, wire feed, electrical power output, and shield gas feed by a flexible hose, which may have an outer corrugated sheath, or may be smooth-surfaced with the interior divided into discrete internal compartments, as described in my U.S. Pat. No. 4,496,823, the disclosure of which is incorporated herein by reference.

It is conventional to provide a joint at the upstream end of the conduit to permit the various services, namely welding wire feed, control wires, electrical power feed and shield gas feed to be provided to the flexible hose and thence to the welding gun head, while at the same time permitting removal of vacuum extracted gases passing through the hose. Such a joint, usually is in the form of a T and is constructed of metal with appropriate fittings to permit the above-noted activities.

SUMMARY OF INVENTION

The present invention provides a novel T/Y-joint construction for effecting the feed of services to the flexible hose and removal of gases therefrom. The joint comprises two semi-circularly contoured halves which are snap-locked together longitudinal line of join to form an elongate cylindrical first hollow body member and an elongate cylindrical second hollow body member extending at an angle to and merging with the first hollow body member so as to provide fluid flow communication therebetween. The two halves of the joint preferably are formed of molded polymeric material.

The first hollow body member is closed at one end by a cylindrical end closure, preferably, integrally-formed with one of the two molded halves. The end closure has a first bore therethrough with a keyed recess at the interior end thereof and second, third and fourth bores therethrough.

By providing the joint in the form of two semi-cylindrical inter-locking portions, a much cheaper and easier to construct joint is provided, particularly when pre-molded. The bores through the end closure permit services required by the gun to be fed from an exterior location through the bore to the gun head. The keyed recess in the one bore allows a power cable through which welding wire passes to be secured to the end closure by a correspondingly-shaped element on the power cable, received in the recess.

The second hollow body member is connected to a vacuum source so as to draw fumes from the welding site back through the welding gun for discharge.

DESCRIPTION OF PREFERRED EMBODIMENT

Figure 1:
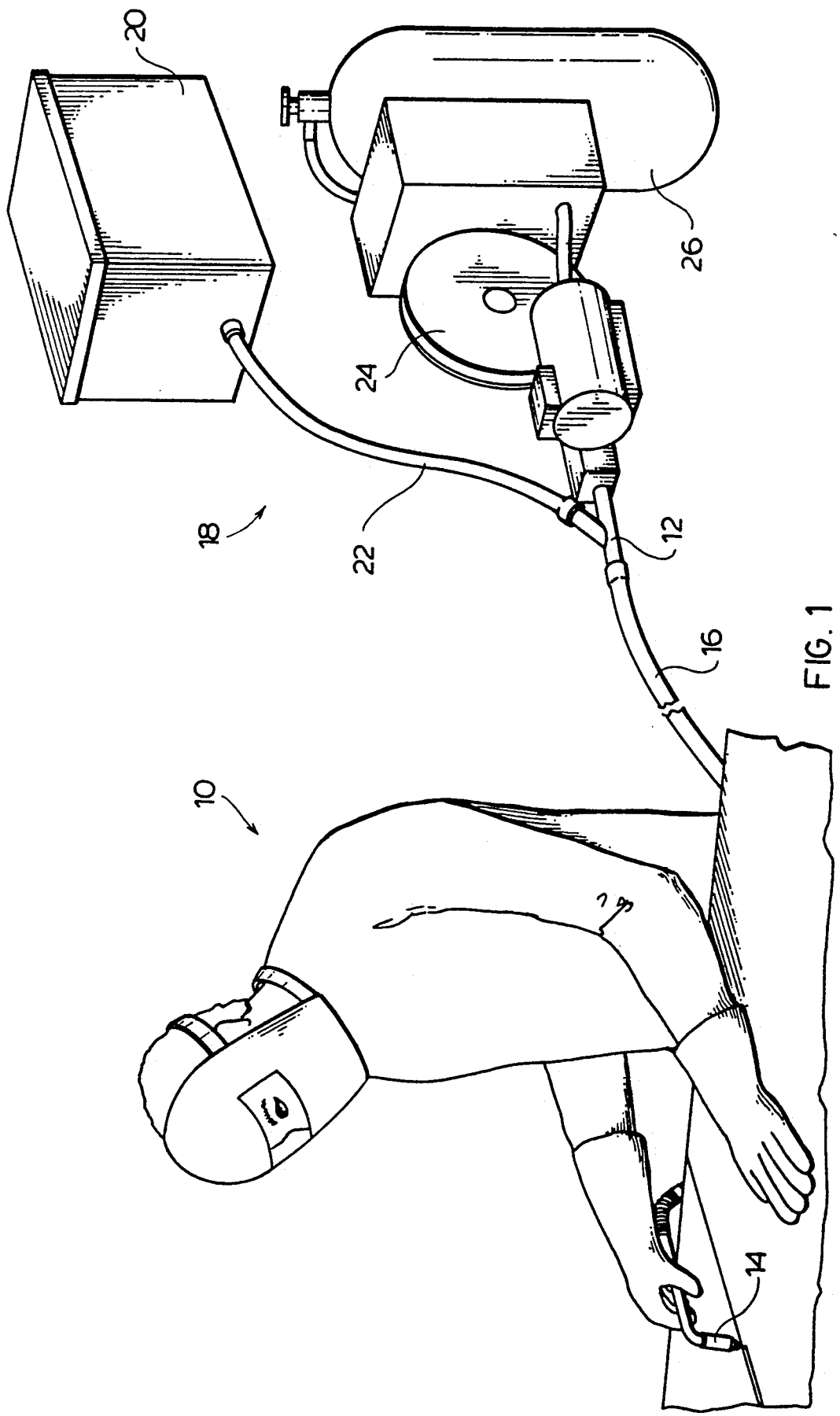
FIG. 1 is a schematic representation of a fume-extracting welding apparatus incorporating a T-Y joint constructed in accordance with one embodiment of the invention.

Referring first to FIG. 1, there is shown schematically a fume-extracting welding gun 10 incorporating a T-Y joint 12 constructed in accordance with one embodiment of the invention. The gun 10 includes a welding gun head 14, a flexible connector hose portion 16 and a services supply portion 18. The flexible connector hose portion 16 may be constructed as described in my U.S. Pat. No. 4,496,823, the disclosure of which is incorporated herein by reference. The welding gun head 14 may be constructed as described in my U.S. Pat. No. 4,727,238, the disclosure of which is incorporated herein by reference, or in my copending U.S. patent application Ser. No. 434,275 filed Nov. 13, 1989 ["Nozzle"], the disclosure of which is incorporated herein by reference.

The flexible connector hose 16 terminates in the joint 12 which communicates with a vacuum pump 20 by a tube 22. The vacuum pump 20 applies a vacuum to the interior of the hose 16 to remove fumes from adjacent the welding site at the head 14.

The supply services portion 18 includes a consumable wire feed mechanism 24 which includes a reel of welding wire, an electrical connector connected to a power cable, an inert gas feed pipe connected through a solenoid-operated solenoid valve to a source of inert gas 26 for providing shield gas to the welding site.

Figure 2:
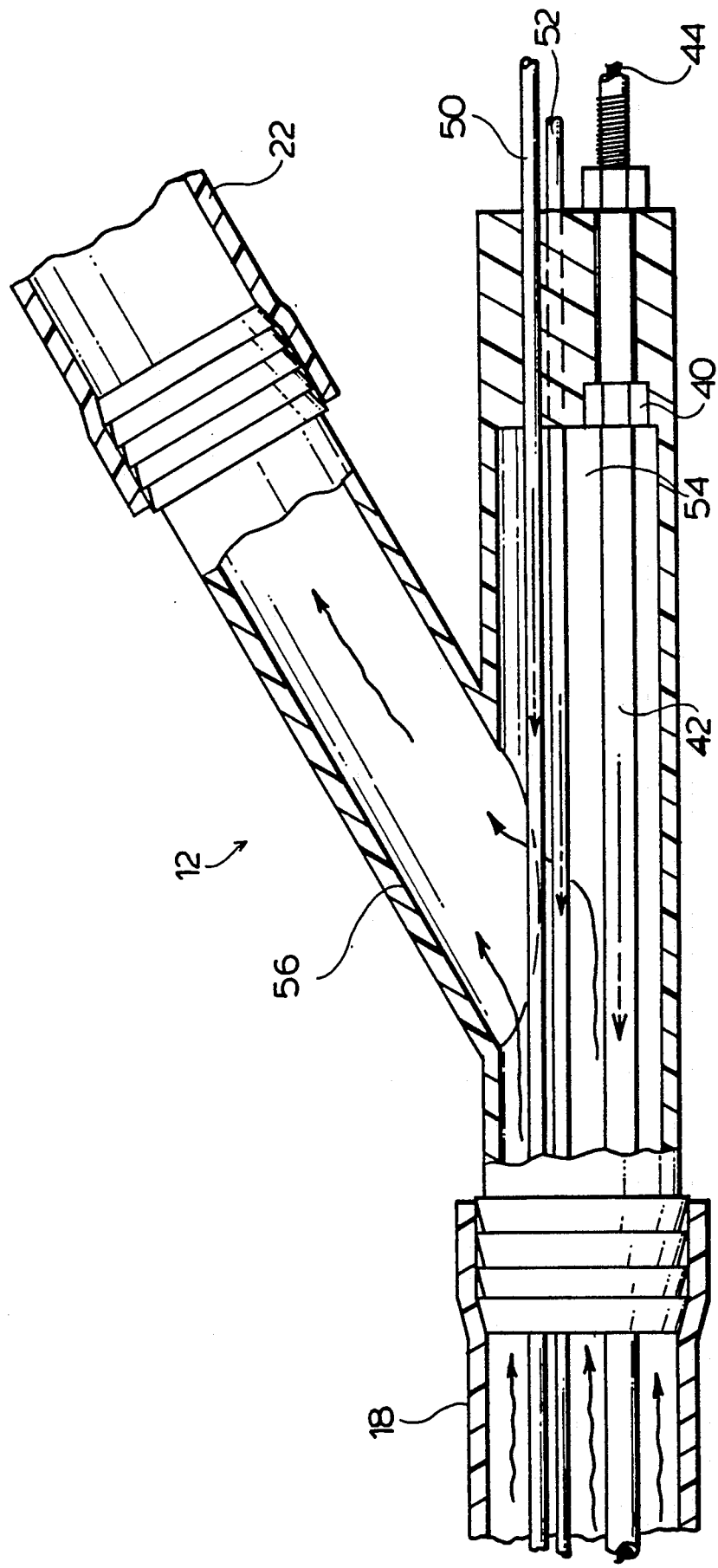
FIG. 2 is a sectional view of a T-Y joint constructed in accordance with one embodiment of the invention.
Figure 3:
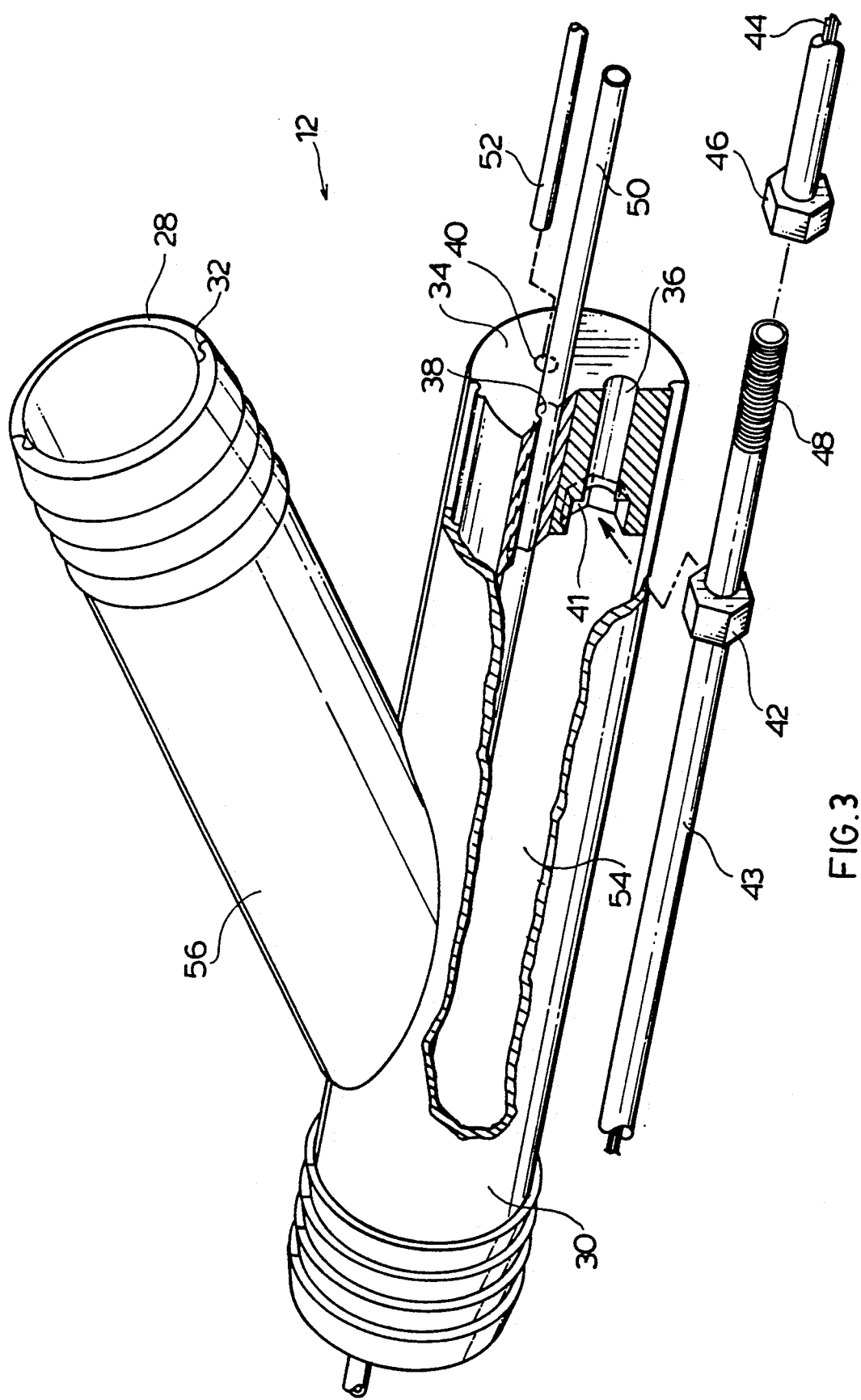
FIG. 3 is a perspective, with parts cut-away for clarity of the T-Y joint of FIG. 2.

Referring to FIGS. 2 and 3, there is illustrated therein in detail an embodiment of a T-Y joint 12 provided in accordance with the invention. In contrast to the prior art, the joint 12 of the present invention is formed of molded parts 28 and 30 which snap lock together to provide the assembled joint. By providing the joint 12 of two molded parts, the present invention is advantageous in comparison to prior structures in being much cheaper to construct and yet is effective to achieve the desired result of such joints.

The snap-joint between the parts 28 and 30 may be provided in any convenient manner. As illustrated, inter-fitting complimentary S-shaped peripheries 32 may be provided at the curvilinear extremities of each of the parts 28 and 30.

One of the parts 28 has a complete end closure 34 integrally molded therewith, so that, when the parts 28 and 30 are fitted together, the end closure 34 provides the end closure of the joint 12. Formed through the end closure are four bores, only three of which are numbered 36, 38 and 40 are shown.

The bore 36 is formed with a hexagon-shaped recess 41 at its inner end to receive a complimentarily-shaped hexagon nut 42 mounted to a power cable 43 through which a welding wire 44 passes in sliding relation. The power cable 43 is locked in place in the bore 36 by a second exterior hexagon-shaped nut 46 mounted on a screw-threaded portion 48 of the power cable 43.

One of the other openings 38 has a shield gas feed pipe 50 pass therethrough to feed shielding gas to the welding gun head 14 so as to provide shielding gas at the welding site.

The other openings 40 each have an electrical connector wires conduit 52 passing therethrough to carry electrical power to the on-off switch for the welding gun.

The power cable 43, the shield gas feed pipe 50 and the electrical wires conduit 52 pass through the hollow interior 54 of the joint 12 and thence via the hose 16 to the welding gun 14.

The joint 12 has an integral tubular arm 56 which extends at an angle to and merges with the main hollow body of the joint 12 so as to be in fluid-flow communication therewith.

The tubular arm 56 is connected at its free end to the vacuum pump 20 by vacuum hose 22. The vacuum applied through the vacuum hose 22 draws fumes from the location of the welding site back through the gun head 14 and hose 16.

The T-Y joint 12, therefore, provides a relatively simple assembly of two molded parts and yet achieves the various functions of the prior art joints.

SUMMARY OF DISCLOSURE

In summary of this disclosure, the present invention provides a novel joint structure for a welding gun which is comprised of interfitting parts. Modifications are possible within the scope of this invention.

What I claim is:

1. A joint suitable for joining services to a welding gun, comprising:

two semi-circulary contoured pre-molded polymeric material elements each having curvilinear extremities of complimentary shape to the other to permit said elements to be snap-locked together along a longitudinal line of join of said elements one to another at said curvilinear extremities, said joint having an elongate cylindrical first hollow body member and an elongate cylindrical second hollow body member extending at an angle to and merging with said first hollow body member so as to provide fluid-flow communication therebetween, said first hollow body member being closed at one end by a cylindrical end closure integrally formed with one of said two pre-molded elements, said end closure having a first bore therethrough with a keyed recess at an end thereof interior of said first hollow body member and further bores therethrough.

2. The joint of claim 1 wherein three further bores are formed through said end closure.

3. The joint of claim 1 wherein said keyed recess is of hexagonal shape.

* * * * *